(12) United States Patent  (10) Patent No.: US 7,542,037 B2
Fremming  (45) Date of Patent: *Jun. 2, 2009

(54) THREE DIMENSIONAL GEOLOGICAL MODEL CONSTRUCTION

(75) Inventor: Nils P. Fremming, Oslo (NO)

(73) Assignee: Schlumberger Technology Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/415,211

(22) Filed: May 2, 2006

(65)  Prior Publication Data

US 2006/0197759 A1  Sep. 7, 2006

Related U.S. Application Data

(63) Continuation of application No. 10/317,067, filed on Dec. 12, 2002, now Pat. No. 7,248,259.

(60) Provisional application No. 60/339,296, filed on Dec. 12, 2001.

(51) Int. Cl.
 G06T 17/00 (2006.01)
 G06T 11/20 (2006.01)
 G01V 1/28 (2006.01)
 G01V 1/00 (2006.01)

(52) U.S. Cl. .................. 345/420; 345/440; 702/17; 702/18; 367/72

(58) Field of Classification Search ............ 345/420; 702/6, 14, 16, 17, 18; 367/72
 See application file for complete search history.

(56)  References Cited

U.S. PATENT DOCUMENTS 4,821,164 A * 4/1989 Swanson .................. 702/5
4,953,142 A   8/1990 Rimmer
4,991,095 A * 2/1991 Swanson ................. 702/16
5,251,184 A * 10/1993 Hildebrand et al. ........ 367/72

(Continued)

OTHER PUBLICATIONS

Pratt, "Techniques for Conic Splines", Proceedings of the 12th Annual Conference on Computer Graphics and interactive Techniques, SIGGRAPH '85. ACM Press, New York, NY, pp. 151-160.*

(Continued)

*Primary Examiner*—Kee M Tung
*Assistant Examiner*—Roberta Prendergast
(74) *Attorney, Agent, or Firm*—Robert P. Lord; Jim Patterson; Bryan Galloway

(57)  ABSTRACT

A method for modeling geological structures includes identifying fault planes in a geologic structure, and creating a set of substantially vertically oriented pillars along the fault plane. The pillar grids are then combined into a common three-dimensional grid pillar network, and a two-dimensional plane is defined that intersects the middle node of the pillars. Planes are identified that are oriented in the substantially horizontal direction and horizontal node points are created, and such a process is repeated for other node levels. A skeleton grid is then created by drawing a substantially vertically oriented pillar through each corresponding grid intersection, and then primary horizons as defined by interpretation of seismic data are inserted into the skeleton grid. And, a final scale resolution is created by dividing the spaces bounded between actual horizons and fault planes, and eventual actual part of the outer boundary into one or more horizontally oriented fine layers.

75 Claims, 6 Drawing Sheets

U.S. PATENT DOCUMENTS

| | | | |
|---|---|---|---|
| 5,349,527 A | | 9/1994 | Pieprzak et al. |
| 5,408,598 A | * | 4/1995 | Pryor, Jr. .................... 345/442 |
| 5,471,574 A | * | 11/1995 | Prasad ........................ 345/442 |
| 5,563,949 A | * | 10/1996 | Bahorich et al. .............. 702/16 |
| 5,615,171 A | * | 3/1997 | Hildebrand ................... 367/72 |
| 5,627,949 A | * | 5/1997 | Letcher, Jr. ................. 345/420 |
| 5,648,937 A | * | 7/1997 | Campbell ..................... 367/27 |
| 5,671,344 A | * | 9/1997 | Stark .......................... 345/419 |
| 5,740,342 A | * | 4/1998 | Kocberber ................... 345/420 |
| 5,838,634 A | | 11/1998 | Jones et al. |
| 5,841,441 A | | 11/1998 | Smith |
| 5,844,564 A | | 12/1998 | Bennis et al. |
| 5,856,828 A | * | 1/1999 | Letcher, Jr. ................. 345/420 |
| 5,953,680 A | | 9/1999 | Divies et al. |
| 5,982,707 A | | 11/1999 | Abbott |
| 5,990,897 A | * | 11/1999 | Hanratty ..................... 345/420 |
| 6,014,343 A | | 1/2000 | Graf et al. |
| 6,018,498 A | * | 1/2000 | Neff et al. ..................... 367/72 |
| 6,078,869 A | | 6/2000 | Gunasekera |
| 6,106,561 A | | 8/2000 | Farmer |
| 6,151,555 A | | 11/2000 | Van Bemmel et al. |
| 6,191,787 B1 | * | 2/2001 | Lu et al. ....................... 345/418 |
| 6,230,101 B1 | | 5/2001 | Wallis |
| 6,302,221 B1 | | 10/2001 | Hamman et al. |
| 6,370,491 B1 | * | 4/2002 | Malthe-Sorenssen et al. .. 703/2 |
| 6,373,486 B1 | | 4/2002 | Simpson |
| 6,388,947 B1 | | 5/2002 | Washbourne et al. |
| 6,401,042 B1 | * | 6/2002 | Van Riel et al. ............... 702/17 |
| 6,446,006 B1 | * | 9/2002 | Thore ........................... 702/5 |
| 6,480,790 B1 | * | 11/2002 | Calvert et al. ................. 702/14 |
| 6,542,174 B2 | | 4/2003 | Senda et al. |
| 6,590,575 B1 | | 7/2003 | Takezawa |
| 6,693,631 B2 | | 2/2004 | Hubeli et al. |
| 6,711,529 B1 | * | 3/2004 | Thore ........................... 703/2 |
| 6,750,864 B1 | | 6/2004 | Anwar |
| 6,820,074 B1 | * | 11/2004 | Simpson ....................... 707/3 |
| 6,885,368 B2 | * | 4/2005 | Rotge ........................... 345/420 |
| 6,907,392 B2 | * | 6/2005 | Bennis et al. ................. 703/10 |
| 6,989,841 B2 | * | 1/2006 | Docherty ..................... 345/629 |
| 7,031,891 B2 | * | 4/2006 | Malthe-Sorenssen et al. .. 703/2 |
| 7,043,410 B2 | * | 5/2006 | Malthe-Sorenssen et al. .. 703/2 |
| 7,047,165 B2 | * | 5/2006 | Balaven et al. ................ 703/2 |
| 7,069,149 B2 | * | 6/2006 | Goff et al. ..................... 702/16 |
| 7,089,166 B2 | * | 8/2006 | Malthe-Sorenssen et al. . 703/10 |
| 7,123,258 B2 | * | 10/2006 | Deny et al. ................... 345/423 |
| 2002/0038210 A1 | * | 3/2002 | Yajima et al. ................ 704/230 |
| 2002/0042678 A1 | * | 4/2002 | Bevc et al. .................... 702/18 |
| 2003/0112704 A1 | | 6/2003 | Goff et al. |
| 2004/0246249 A1 | * | 12/2004 | Deny et al. ................... 345/419 |

OTHER PUBLICATIONS

Farin, "From Conics to NURBS: A Tutorial Survey", IEEE Computer Graphics and Applications, 1992.*

Pavlidis, "Curve Fitting with Conic Splines", ACM Transactions on Graphics, Jan. 1983, vol. 2, Issue 1, pp. 1-31.*

Pottman, "Locally Controllable Conic Splines with Curvature Continuity", ACM Transactions on Graphics, Oct. 1991, vol. 10, Issue 4, pp. 366-377.*

Fröhlich, et al., 1999, "Exploring geo-scientific data in virtual environments", Proceedings of the Conference on Visualization '99: Celebrating Ten Years, IEEE Visualization, IEEE Computer Society Press, Los Alamitos, CA, pp. 169-173.*

Gunasekera, D., Herring, J., Cox, J., "Segmented Coordinate Line Based Unstructured Grids", Paper for presentation at the 6th European Conference on the Mathematics of Oil Recovery, Schlumberger GeoQuest, Sep. 8-11, 1998, 7 pages.

Farmer, C.L., An Application of Triangulations to the Building of Structured Grids, Paper for presentation at the 6th European Conference on the Mathematics of Oil Recovery, Schlumberger GeoQuest, Sep. 8-11, 1998, 7 pages.

Gunasekera, D., Childs, P., Herring, J., Cox, J., "A Multi-Point FLux Discretization Scheme for General Polyhedral Grids", Society of Petroleum Engineers, Inc., 1998, pp. 253-261.

Gunasekera, D., SPE, Cox, J., Lindsey, P., GeoQuest, "The Generation and Application of K-Orthogonal Grid Systems", Society of Petroleum Engineers, Inc., 1997, pp. 199-214.

* cited by examiner

THREE DIMENSIONAL GEOLOGICAL MODEL CONSTRUCTION

CROSS REFERENCE TO RELATED APPLICATION

This is a continuation application of U.S. Application Ser. No. 10/317,067 filed on Dec. 12, 2002, and entitled "Three Dimensional Geological Model Construction."

BACKGROUND OF THE INVENTION

1. Field of the Invention

This invention relates to methods and systems for use in constructing three-dimensional geological models. In particular, the invention provides methods, apparatuses and systems for more effectively and efficiently creating such models using a grid of pillars in three dimensions.

2. Discussion of the Background

The energy industry is continuously involved in the location of underground deposits of hydrocarbons, such as oil, in earth formations. In order to locate such hydrocarbons, "computer modeling" is a technique that is used for the purpose of simulating the earth formation in which the underground deposits of hydrocarbons are located. The earth formation includes a plurality of horizons and a multitude of faults which intersect the horizons.

SUMMARY OF THE INVENTION

In view of the above, an object of the present invention is to provide methods, apparatuses and systems for constructing three dimensional geologic models in three dimensions while eliminating or minimizing the impact of problems and limitations in other systems.

The present invention advantageously provides a method for modeling geological structures, where faults, horizons and zones within the geologic structure are modeled by a common framework using a three-dimensional grid of pillars. The method includes the steps of (1) identifying all fault planes in the geologic structure by interpreting information pertaining to the geologic structure, wherein the identified fault planes each have a base level, middle level and top level; (2) creating a set of substantially vertically oriented (z-direction) pillars along each identified fault plane, where each pillar is defined by at least three node points that intersect the fault plane at the base level, middle level and top level of fault plane, such that a series of pillars that corresponds to the geometry of the fault plane are created for each fault plane in the geologic structure that is to be modeled, and so that the combination of the pillars with each of the fault planes becomes a pillar grid; (3) combining the pillar grids of each fault plane into a common three-dimensional grid pillar network that provides a realistic representation of the geometry of the fault planes in the geologic structure that is to be modeled, (4) defining a two-dimensional plane that intersects the node at the middle level of each pillar in the three-dimensional grid pillar network representing the fault planes, and where the outer boundary of the two-dimensional plane are given by an arbitrarily drawn closed curve that defines an area that at least covers the area of the three-dimensional grid pillar network representing the fault planes when projected onto a horizontal plane, such that the two-dimensional plane is divided into a set of horizontally oriented sub-zones bounded by the corresponding fault planes and part of the outer boundary, (5) identifying the fault planes that are oriented in the substantially horizontally i- and j-direction respectively, and creating a two-dimensional network of grip lines in i- and j-direction in each sub-zone bounded by the corresponding fault planes and outer boundary, (6) creating horizontal node points at intersections between i- and j-lines, such that i- and j-lines are made as perpendicular to each other as possible and such that the area of each cell defined by the two-dimensional network are made as equal as possible; (7) repeating steps 4) and 6) for the base level and top level of node points of the three-dimensional grid pillar network representing the fault planes, such that corresponding substantially horizontally oriented two-dimensional sub-zones are created for at least the base- middle- and top-level of the three-dimensional grid pillar network representing the fault planes, (8) creating a skeleton grid by drawing a substantially vertically oriented pillar through each corresponding grid intersections in the at least base-, middle-, and top two-dimensional grid representing the horizontally oriented two-dimensional sub-zones, thus creating a vertically oriented pillar network that represents the space between the corresponding bounding fault planes and part of the outer boundary as defined by the arbitrarily drawn closed curve for each sub-zone, (9) inserting all primary horizons as defined by interpretation of information pertaining to the primary horizons into the skeleton grid such that the horizons are placed correctly in relation to the fault planes, and define the vertical coordinate of each primary horizon node as the intersection between the actual horizon plane and skeleton pillar, (10) repeating step (9) for all geological zones as determined by the interpretation of information pertaining to the geological zones, such that a complete geological description of the geologic structure that is to be modeled is formed, and (11) creating final scale resolution by dividing all spaces bounded between actual horizons and fault planes, and eventual actual part of outer boundary into one or more horizontally oriented fine layers.

In a preferred embodiment of the present invention, the thicknesses of the geological zones are given as isochors, surfaces representing the vertical thickness in each zone. In another preferred embodiment of the present invention, the thicknesses of the geological zones are given as isopachs, surfaces representing the stratigraphic thickness of each zone. In another preferred embodiment of the present invention, the thicknesses of the geological zones are given as constant values, as an absolute number or percentage of the total thickness of the actual zone. A preferred embodiment of the present invention is further characterized in that the fine layering is performed by adding layers from base to top of each geological zone by using constant thickness and truncating at the top layer. A preferred embodiment of the present invention is further characterized in that the fine layering is performed by adding layers by proportional thickness using a specified number of fine layers in each geological zone. A preferred embodiment of the present invention is further characterized in that the fine layering is performed by adding layers from base to top of the geological zone using a dipping surface.

Other objects, features and advantages of the present invention will become apparent to those of skill in art by reference to the figures, the description that follows and the claims.

BRIEF DESCRIPTION OF THE DRAWINGS

The patent or application file contains at least one drawing executed in color. Copies of this patent or patent application publication with color drawing(s) will be provided by the Office upon request and payment go the necessary fee.

FIG. 7C illustrates generating final fine scale resolution in accordance with a preferred embodiment of the present invention.

DETAILED DESCRIPTION OF THE INVENTION

In the following detailed description of the preferred embodiments and other embodiments of the invention, reference is made to the accompanying drawings. It is to be understood that those of skill in the art will readily see other embodiments and changes may be made without departing from the scope of the invention.

Figure 1:
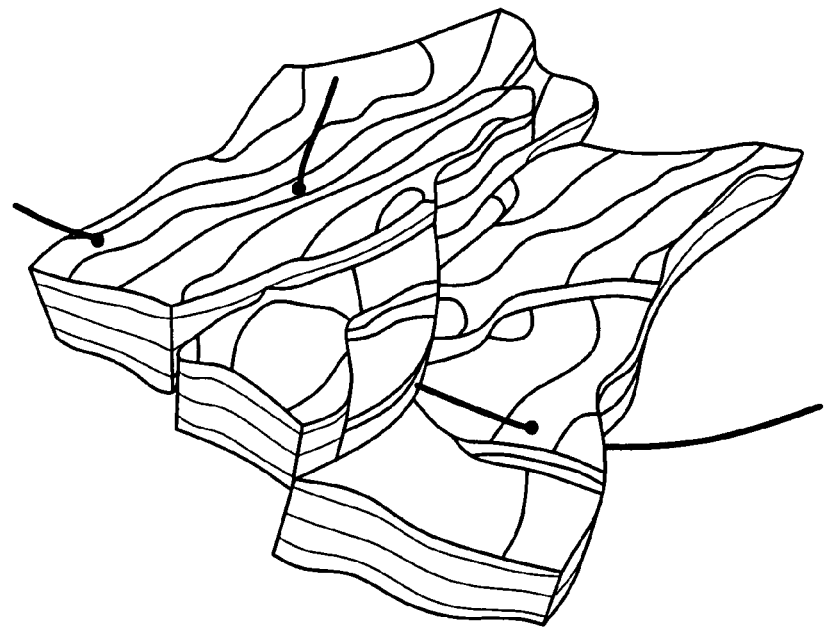
FIG. 1 is a diagram illustrating a preferred embodiment of the present invention.

The present invention provides a new approach to modeling geological structures, using a grid of pillars in 3D. This method allows the creation of faults, horizons and zones within a single 3D grid. (See FIG. 1.) The construction of the grid is performed step by step, using the original data directly, as seismic interpretation and well picks.

The key benefit of this method is that faults and geological horizons are modeled within the same framework, ensuring consistency whilst retaining control over interpolation and extrapolation of data.

The result is that structural models can be generated 10-100 times faster than previously possible and rapidly updated as new data becomes available. The approach is incorporated in the modeling software package, Petrel, developed by Technoguide, the current version is incorporated herein by reference in its entirety and is part of the present invention.

Step 1

Fault Modeling

The purpose of the fault modeling is to generate a realistic description of faulting which can be incorporated into a 3D grid. The modeling results in a wire frame structure with groups of pillars describing the faults. This structure is used in the next step.

Figure 2:
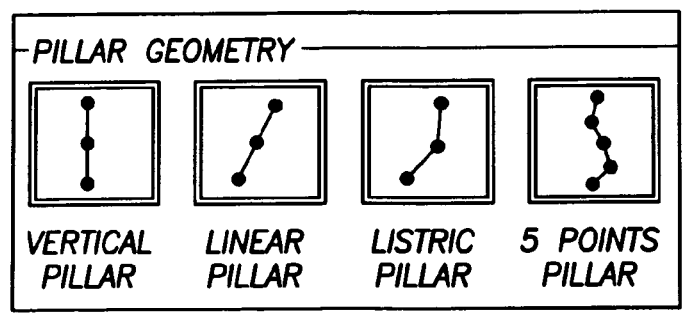
FIG. 2 is diagram that illustrates geometries of pillars in accordance with the present invention.

A pillar is a three dimensional line or a curve limited by an upper and lower level. The pillars can be one of the following geometries (examples of which are depicted in FIG. 2), depending on the number of control points used to define them:

Vertical pillar (straight line);
Linear pillar (straight line, inclined);
Listric pillar (spline curve with 3 points);
Curved pillar (spline curve with 5 points); and
Other types pillars can be added later.

Figure 3:
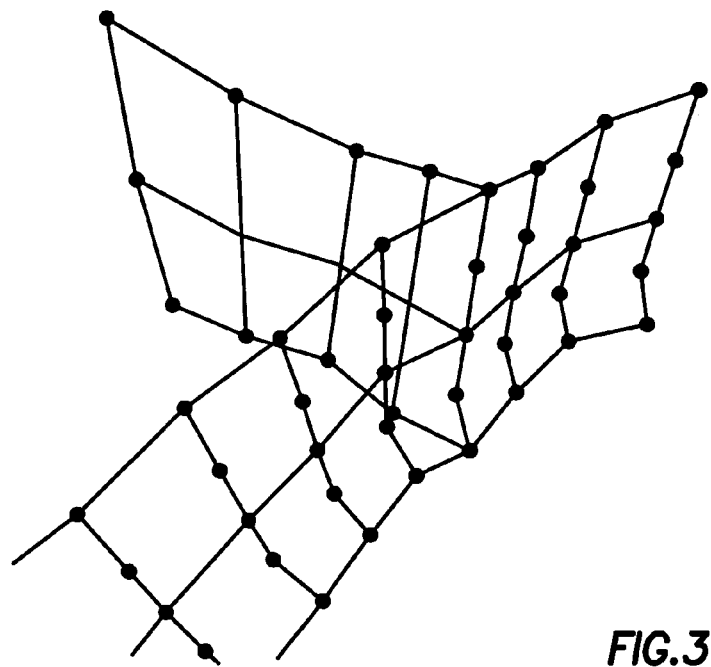
FIG. 3 depicts pillars in accordance with the present invention grouped together to form fault planes.

Pillars are grouped together to form fault planes. (See FIG. 3.) It is possible for pillars to be part of two separate fault planes, thus joining faults together and allowing the generation of branching and crossing faults. In this way the pillars can describe a huge network of faults whilst still providing a realistic description of the relationships between individual faults.

Figure 4:
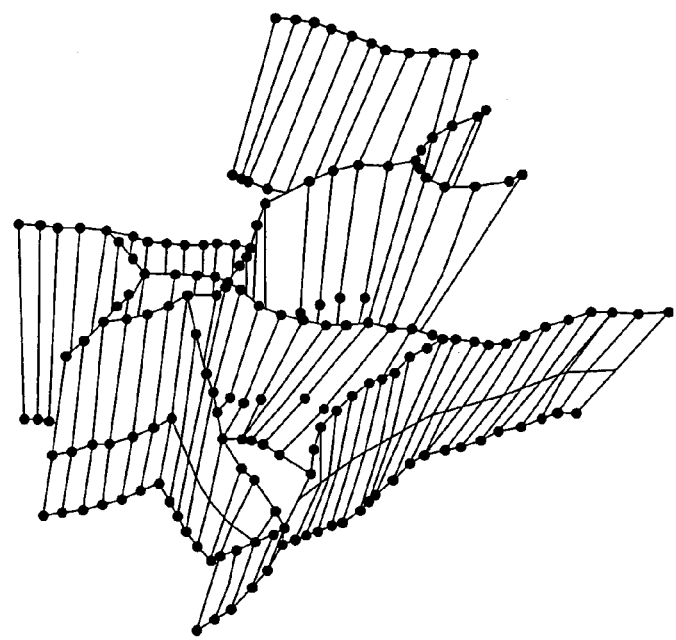
FIG. 4 is a depiction of a fault model being constructed in accordance with the present invention.

The user creates the fault model interactively in the 3D window. (See FIG. 4.) New pillars can be made by picking on any objects in the 3D space, e.g. seismic data, interpreted surfaces, interpreted seismic lines or well top picks. The shape of each pillar (i.e. the number of control points used to describe it) can be changed at any time during editing and the nodes and pillars themselves can be moved interactively in 3D.

In order to understand the methodology, it is noted that data from horizons and zones is not required during the building of the fault model.

Step 2

Gridding

Gridding is done in Petrel in order to incorporate the faults into a single 3D skeleton grid, which can be used for structural modeling.

The skeleton grid consists of pillars sorted in a two dimensional matrix (rows & columns). This is a non-physical notation and refers to the way the data is organized, not the physical position of the pillars. Since the pillars are unconstrained in the X, Y and Z-directions, the grid is irregular in all three dimensions.

The fault model defines the skeleton grid layout. Users may also input trends by defining the orientation given to parts of faults or arbitrary lines. The orientation can be set as arbitrary (default), I direction or J direction. A fault set with an orientation in the I direction will be a part of a row in the skeleton grid whilst J directions be a part of column. Arbitrary faults will sometimes follow the I-direction and sometimes the J-direction, depending on their geometry and the grid layout.

The grid is limited by a boundary. This boundary is normally a two dimensional curve between faults where the faults pass outside the area to be modeled. The curve will be connected to the middle control point of the pillar. If there are no faults going out of the field, the boundary can be given by a closed two dimensional curve. Parts of the grid falling outside the boundary will not have any pillars.

Figure 5:
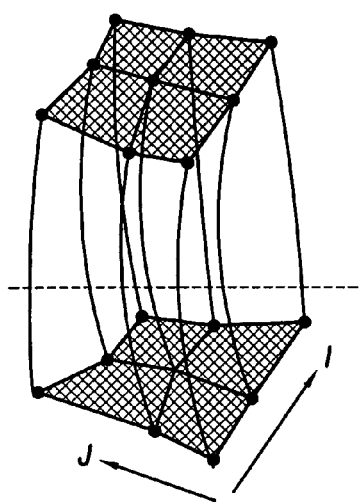
FIG. 5 depicts a small skeleton constructed in accordance with the present invention.

FIG. 5 shows a small skeleton grid, containing three rows and three columns of pillars. The notation I and J correspond to the direction of the grid nodes and is a non-physical notation. The pillars maintain their real position in 3D.

The layout of the grid is constructed using a 2D projection of the middle control point of the pillars describing the fault model. The algorithm tries to make the I and J grid lines perpendicular to each other and the two dimensional area of each grid cell is as equal as possible. The grid lines in one direction are not allowed to intersect each other. The user is able to control the grid resolution, the density of the grid lines in certain areas, and the grid line smoothness by a number of user settings.

Figure 6A:
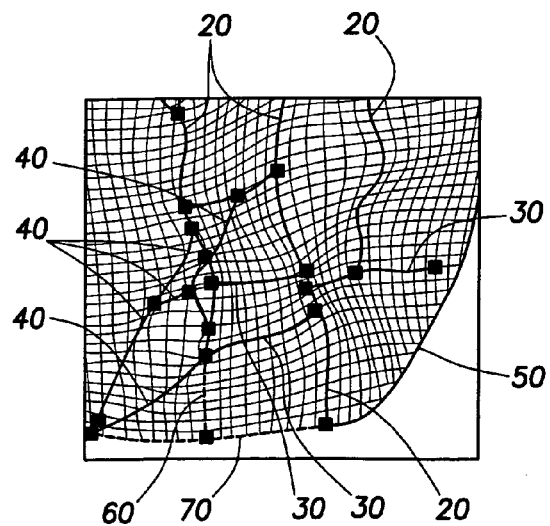
FIG. 6A is a two dimensional projection of the middle control point of a pillar constructed in accordance with a preferred embodiment of the present invention, illustrating smooth faults.
Figure 6B:
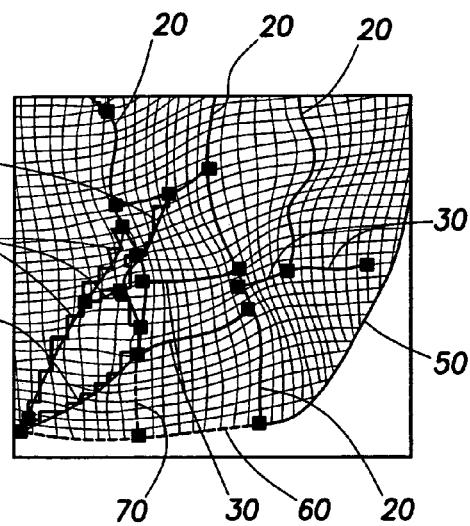
FIG. 6B is a two dimensional projection of the middle control point of a pillar constructed in accordance with a preferred embodiment of the present invention, illustrating zig-zaged faults.

FIGS. 6A and 6B show how the faults are incorporated into the grid. FIGS. 6A and 6B are 2D projections of the middle control point of the pillars describing the fault model. The faults are shown by numeral 20 (oriented along the J direction), by numeral 30 (oriented along the I direction) and by numeral 40 (arbitrary direction). The line 50 forms a part of the boundary. The lines 60 and 70 are trends, which are used to direct the grid lines along a particular orientation. FIG. 6B demonstrates the use of zig-zagged faults, suitable for flow simulation, while FIG. 6A shows smooth faults. Note how the grid lines follow the faults.

Pillars generated during fault modeling are resampled into the skeleton grid at the resolution specified by the user. This process is aimed at changing the geometry of the fault pillars as little as possible. Fault information such as name and the connections between the faults are also maintained in the grid generated. This information is stored with the pillars forming the fault, and is used in order to model faults correctly. The original fault model has now been incorporated in the grid and is no longer required, other than for regeneration of new grids with alternative user inputs.

By changing the user input e.g. grid resolution and the handling of faults, separate grids suitable for geological modeling or flow simulation can be generated from the same fault model.

Step 3

Vertical Layering

Figure 7A:
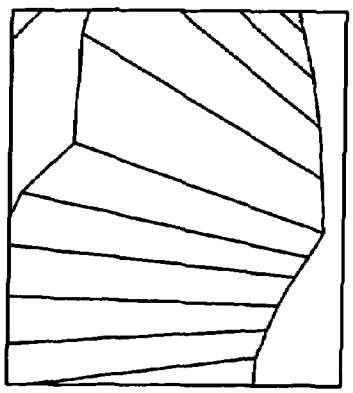
FIG. 7A illustrates modeling primary horizons in accordance with a preferred embodiment of the present invention.
Figure 7B:
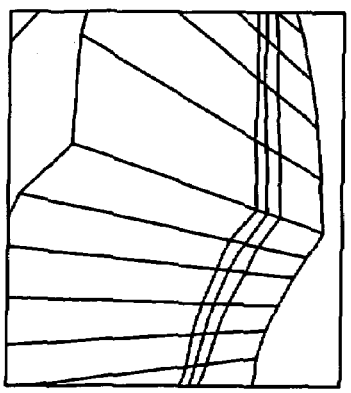
FIG. 7B illustrates geological zonation in accordance with a preferred embodiment of the present invention
Figure 7C:
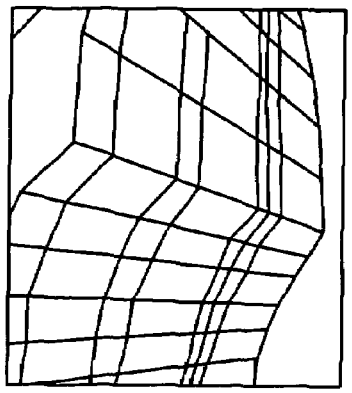
FIG. 7C depicts.

The vertical layering will be done in three main steps. The steps are:

Step 3.1—Model primary horizons (see FIG. 7A);
Step 3.2—Geological zonation (see FIG. 7B); and
Step 3.3—Generate final fine scale resolution (see FIG. 7C).

During vertical layering, geological horizons are added into the skeleton grid, to form a complete geological description. The Z coordinate of each horizon at each of the existing pillars is described by adding a horizon node to each pillar. The exact 3D position of a horizon node, (x,y,z) is calculated from the Z coordinate and the geometry of the pillar itself.

For each geological horizon, non-faulted pillars have one horizon node, while faulted pillars have 2 horizon nodes, one for footwall and one for hanging wall. If the pillar is at the junction of a branched fault it will have 3 horizon nodes whilst pillars at crossing faults will have 4 horizon nodes. This information has been generated during the gridding process.

Figure 8:
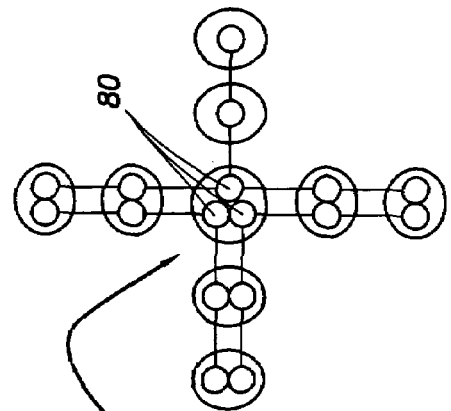
FIG. 8 illustrates a main fault with a branch in accordance with a preferred embodiment of the present invention.
Figure 8:
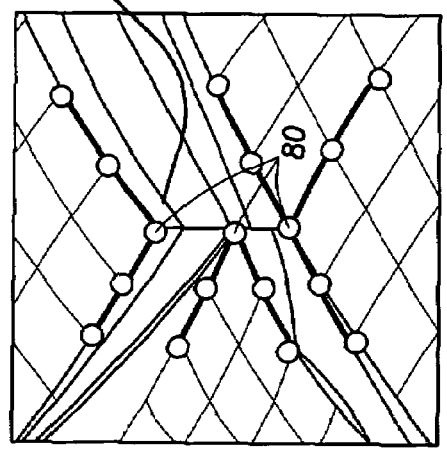

FIG. 8 shows a main fault with a branch. The logical layout of the horizon nodes is drawn. The points identified by numeral 80 are the horizon nodes for the pillar that is connected to both faults.

Both the horizon nodes and the pillar geometry can be edited interactively after they have been generated.

The 3D model itself maintains information and status about each of the horizons and zones. Therefore, any of the three steps used to create vertical layering can be rerun at any time, this facilitates changing or update the model when new data input is available.

Step 3.1

Model Primary Horizons

Figure 9:
FIG. 9 depicts a primary horizon modeled in accordance with a preferred embodiment of the present invention.

Primary horizons are made directly from the seismic interpretation or from point data, surfaces, or lines data as contours. (See FIG. 9.) Several data source can be combined and applied to different fault compartments. The horizons can be adjusted to match well picks.

The algorithm behind this includes both local interpolation and global interpolation/extrapolation. During local interpolation, the horizon node will get its elevation from either the input points closest to the pillar or from a number of points within a user specified distance from the pillar. Using the second option this distance is used to form a three dimensional cylinder around the pillar, which follows the pillar geometry. All points inside the cylinder will be used for the local interpolation.

Various interpolation algorithms can be used in the local interpolation. The most common is the moving average algorithm, where the elevation is weighted by the quadruple of its distance to the pillar.

If the input is a surface, an intersection algorithm between the pillar and the surface finds the elevation of the horizon node. Pillars that do not have any neighboring points or surface intersection are left to the global interpolation and extrapolation.

Pillar on the faults are treated differently. Since data close to faults are normally not correct, the user can choose the offset from fault within which local interpolation should not be applied. This can of course also be set to zero such that data close to the fault is honored. The fault itself forms a barrier for point searching, such that data on one side of the fault is not used during interpolation for horizon nodes on the opposite side.

The global interpolation/extrapolation is done on horizon nodes, which have not been defined during the local interpolation. The algorithm tries to minimize the entire curvature on the horizon, by solving a partial differential equation over all unknown horizon nodes. Using the information along the faulted pillars, the algorithm sets the boundary condition at the horizon nodes on or close to the faults to avoid interpolating across the faults.

Well picks are honored by determining the error at each location, and calculating a residual surface. The modeled horizon is then adjusted using this residual surface. During the building of horizons, the user can specify the relationship between them. This is then used to determine the most appropriate method for dealing with any crossing horizons which must be truncated. All horizons are normally generated in one single operation but this can also be done one by one. The user must generate at least one horizon before proceeding to the next step.

Modeling of primary horizons is normally done in the time domain, because seismic data (the most common input) is normally in time. The entire model can then be depth converted prior to geological zonation. Depth conversion of the 3D grid is not discussed herein.

Step 3.2

Geological Zonation

In the geological zonation the volume between the primary horizon is divided into several zones (intervals between horizon), separated by new secondary horizons. The secondary horizons are here stored in the grid exactly as for the primary horizons.

The user can specify the thickness of the zones by giving:

Isochore: Surface representing the vertical thickness of the zones.

Isopacks. Surface representing the stratigraphic thickness of the zone.

Constant value, as an absolute number or percentage of the total thickness.

No specific value, use the well picks to determine the thickness.

The user decides whether to start the zonation from top or from base. The algorithm can also build above the top of primary horizons or below the base of primary horizons. Thickness can be measured by one of the three different methods shown in FIGS. 10A and 10B; vertical thickness, stratigraphic thickness and vertical thickness along pillars. Two figures are shown because the angle between the pillar and the direction perpendicular to the horizon can differ.

If there are well picks available, the secondary horizon is corrected in the same way as the primary horizons. If the user has thickness data for all the zones and is building between two primary horizons, the sum of the thicknesses may not match the thickness between the two primary horizons. In this case volume correction is used and the thickness of the zones is adjusted automatically. This volume correction can be divided up between the all zones or just a few user defined zones.

Step 3.3

Generate Final Fine Scale Resolution

The fine layering is inserted between the existing horizons ins the model. This simply adds new horizon nodes between the existing horizon nodes in the grid. There are various ways of doing this:

Add layer from base or top of the zone using constant thickness.

Add layer by proportional thickness using a specified number of layers. It can be specified a relation between the new layers, for instance 1,4,1,2 means the first and third is one unit thick, the second 4 units thick and the fourth 2 units thick.

Add layer from base or top of the zone using a dipping surface. This surface is a template surface with a dip indicating the dip of the layers at deposit time.

Figure 10A:
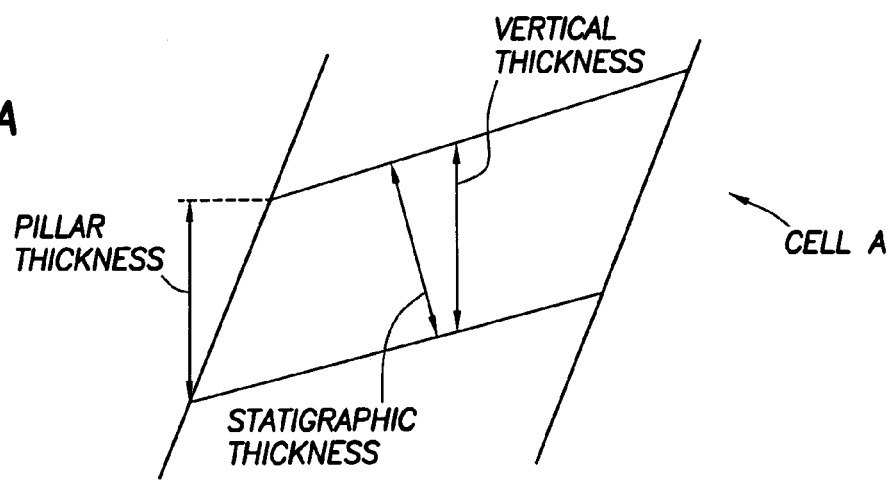
FIG. 10A depicts three methods of determining thickness in accordance with a preferred embodiment of the present invention on a cell A.
Figure 10B:
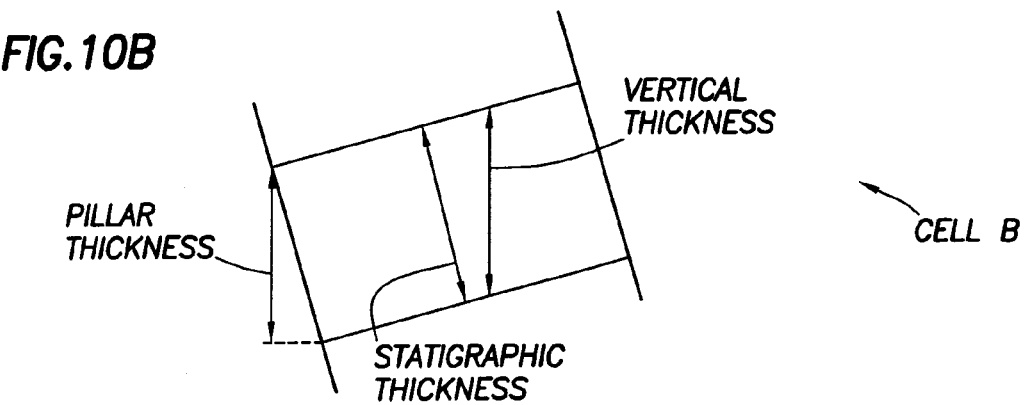
FIG. 10B depicts three methods of determining thickness in accordance with a preferred embodiment of the present invention on a cell B.

Again the algorithm allows the user to select the way in which thickness is measured; see FIGS. 10A and 10B described in the Geological zonation section.

Conclusion

With previous methods, 3D grids are constructed in one single operation. The method described in this paper involves constructing the geological model step by step, using the original data directly, as seismic interpretation and well picks. The steps are:

Step 1—Fault Modeling

Step 2—Gridding

Step 3—Vertical layering, which is divided into:

Step 3.1—Model primary horizons.

Step 3.2—Geological zonation.

Step 3.3—Generation of the final fine scale resolution.

Modeling geology directly on a 3D grid of pillars has many benefits:

Faults, horizons and zones are in one single model, which ensures consistency within the data.

Fault are described and modeled realistically, with full control over interpolation and extrapolation around the faulted area.

Consistent layering, crossing horizons can not occur.

Cells are organized in rows, columns and layers, which makes them ready for facies and petrophysical modeling and flow simulation.

Proof of the benefits of this approach is demonstrated in Petrel, a geological modeling software by Technoguide. Using this method, the time taken to construct a 3D structural grid has been reduced by 10-100 times and rapid updates are possible as new data becomes available. This has provided significant benefits to end users.

Computer Implementation

Figure 11:
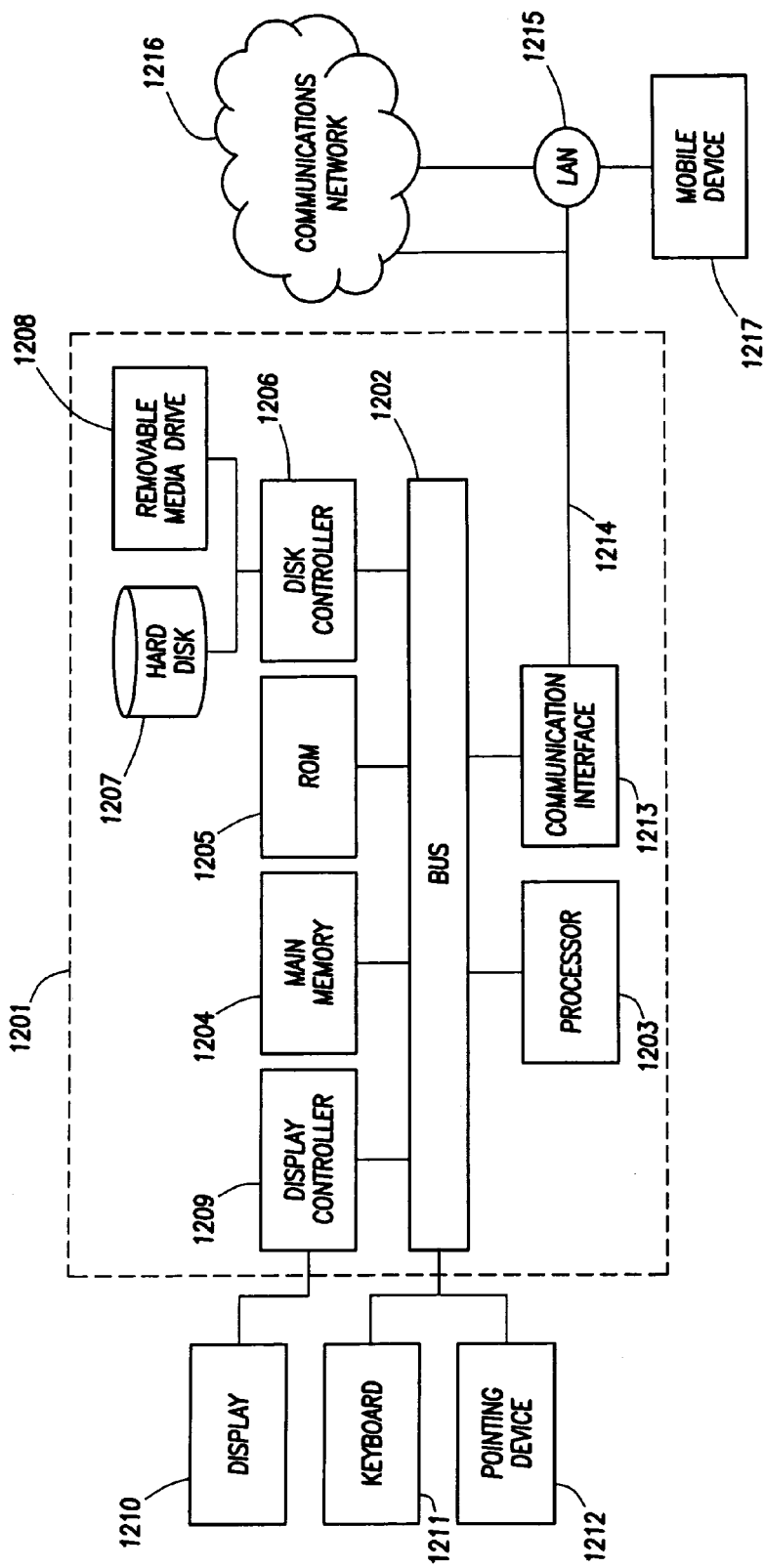
FIG. 11 depicts a diagram of a computer system in accordance with a preferred embodiment of the present invention.

FIG. 11 illustrates a computer system 1201 upon which an embodiment of the present invention may be implemented. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, readonly compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMS (EPROM, EEPROM, flash EPROM), DRAM, SRAM, SDRAM, or any other magnetic medium, compact discs (e.g., CD-ROM), or any other optical medium from which a computer can read.

Stored on any one or on a combination of computer readable media, the present invention includes software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media and volatile media. Non-volatile media includes, for example, optical, magnetic disks, and magneto-optical disks, such as the hard disk 1207 or the removable media drive 1208. Volatile media includes dynamic memory, such as the main memory 1204.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as umodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

Although the foregoing is provided for purposes of illustrating, explaining and describing certain embodiments of the invention in particular detail, modifications and adaptations to the described methods, systems and other embodiments will be apparent to those skilled in the art and may be made without departing from the scope or spirit of the invention.

What is new and desired to be secured by Letters Patent of the United States is:

1. A method of modeling geological structures in an Earth formation using a computer system, the method comprising:
    modeling one or more fault planes in said Earth formation using a group of pillars in three dimensions, wherein the group of pillars describes the one or more fault planes, wherein a fault plane of the one or more fault planes has a base level, a middle level, and a top level, a pillar of the group of pillars being a spline curve defined by at least three node points that intersect the fault plane at the base level, the middle level, and the top level of the fault plane, respectively, and wherein a shape of the pillar is adjustable by changing at least one of the at least three node points defining the pillar,
    wherein each pillar of the group of pillars has a horizon node describing a horizon near the pillar, and
    wherein an elevation of the horizon node on the pillar is determined by interpolation using a plurality of input points within a user specified distance from the pillar.

2. The method of claim 1, wherein the step of modeling one or more faults in said Earth formation comprises:
    generating a wire frame structure based on the group of pillars.

3. The method of claim 2, wherein said group of pillars includes a vertical pillar.

4. The method of claim 2, wherein said group of pillars includes a linear pillar.

5. The method of claim 2, wherein said group of pillars includes a listric pillar.

6. The method of claim 2, wherein said group of pillars includes a curved pillar.

7. The method of claim 2, wherein the method of modeling geological structures further comprises:
   incorporating said group of said pillars describing said one or more fault planes into a three dimensional skeleton grid representing a fault model adapted for said modeling of said geological structures.

8. The method of claim 7, wherein said skeleton grid is limited by a boundary.

9. The method of claim 8, wherein boundary comprises a two dimensional curve between said faults.

10. The method of claim 7, wherein the method of modeling geological structures further comprises:
    performing a vertical layering step, the vertical layering step including adding geological horizons into said skeleton grid thereby forming a complete geological description.

11. The method of claim 10, wherein the vertical layering step comprises: performing the step of modeling primary horizons.

12. The method of claim 11, wherein, during the step of modeling primary horizons, primary horizons are added to said geological description.

13. The method of claim 11, wherein the vertical layering step further comprises: performing the step of geological zonation.

14. The method of claim 13, wherein, during the step of geological zonation, a volume between the primary horizons is divided into one or more zones separated by new secondary horizons.

15. The method of claim 14, wherein a thickness of said one or more zones can be specified by providing an isochore, said isochore representing a surface further representing a vertical thickness of said zones.

16. The method of claim 14, wherein a thickness of said one or more zones can be specified by providing isopacks, said isopacks representing a surface further representing a stratigraphic thickness of the zones.

17. The method of claim 14, wherein a thickness of said one or more zones can be specified by providing a constant value representing an absolute number or a percentage of the total thickness of said zones.

18. The method of claim 13, wherein the vertical layering step further comprises:
    performing the step of generating fine scale resolution.

19. The method of claim 18, wherein the skeleton grid includes existing horizon nodes, and wherein the step of generating fine scale resolution comprises adding new horizon nodes between said existing horizon nodes in said skeleton grid.

20. The method of claim 19, wherein the step of generating fine scale resolution further comprises:
    adding layers from a base or a top of said zone using constant thickness.

21. The method of claim 19, wherein the step of generating fine scale resolution further comprises:
    adding layers by proportional thickness using a specified number of layers.

22. The method of claim 19, wherein the step of generating fine scale resolution further comprises:
    adding layers from a base or a top of said zone using a dipping surface.

23. The method of claim 1, further comprising:
    projecting a middle control point of each pillar of the group of pillars onto a plane;
    placing a plurality of gridlines onto the plane based on a perpendicular condition and a cell size condition; and
    generating a skeleton grid using the plurality of grid lines as a layout for the skeleton grid.

24. The method of claim 1, wherein an elevation of the horizon node on the pillar is determined by local interpolation using an input point closest to the pillar.

25. The method of claim 1, wherein the plurality of input points exists in a cylindrical volume centered on the pillar, wherein a dimension of the cylindrical volume is based on the user specified distance.

26. A computer-readable medium encoded with a computer program and executable by a computer to perform method steps of modeling geological structures in an Earth formation, said method steps comprising:
    modeling one or more fault planes in said Earth formation using a group of pillars in three dimensions, wherein the group of pillars describes the one or more fault planes, wherein a fault plane of the one or more fault planes has a base level, a middle level, and a top level, a pillar of the group of pillars being a spline curve defined by at least three node points that intersect the fault plane at the base level, the middle level, and the top level of the fault plane, respectively, and wherein a shape of the pillar is adjustable by changing at least one of the at least three node points defining the pillar
    wherein each pillar of the group of pillars has a horizon node describing a horizon near the pillar, and
    wherein an elevation of the horizon node on the pillar is determined by interpolation using a plurality of input points within a user specified distance from the pillar.

27. The computer-readable medium of claim 26, wherein the step of modeling one or more faults in said Earth formation comprises:
    generating a wire frame structure based on said group of pillars.

28. The computer-readable medium of claim 27, wherein said group of pillars includes a vertical pillar.

29. The computer-readable medium of claim 27, wherein said group of pillars includes a linear pillar.

30. The computer-readable medium of claim 27, wherein said group of pillars includes a listric pillar.

31. The computer-readable medium of claim 27, wherein said group of pillars includes a curved pillar.

32. The computer-readable medium of claim 27, wherein the method of modeling geological structures further comprises:
    incorporating said group of pillars describing said one or more fault planes into a three dimensional skeleton grid representing a fault model adapted for said modeling of said geological structures.

33. The computer-readable medium of claim 32, wherein said skeleton grid is limited by a boundary.

34. The computer-readable medium of claim 33, wherein boundary comprises a two dimensional curve between said faults.

35. The computer-readable medium of claim 32, wherein the method of modeling geological structures further comprises:

performing a vertical layering step, the vertical layering step including adding geological horizons into said skeleton grid thereby forming a complete geological description.

36. The computer-readable medium of claim 35, wherein the vertical layering step comprises:
performing the step of modeling primary horizons.

37. The computer-readable medium of claim 36, wherein, during the step of modeling primary horizons, primary horizons are added to said geological description.

38. The computer-readable medium of claim 36, wherein the vertical layering step further comprises:
performing the step of geological zonation.

39. The computer-readable medium of claim 38, wherein, during the step of geological zonation, a volume between the primary horizons is divided into one or more zones separated by new secondary horizons.

40. The computer-readable medium of claim 39, wherein a thickness of said one or more zones can be specified by providing an isochore, said isochore representing a surface further representing a vertical thickness of said zones.

41. The computer-readable medium of claim 39, wherein a thickness of said one or more zones can be specified by providing isopacks, said isopacks representing a surface further representing a stratigraphic thickness of the zones.

42. The computer-readable medium of claim 39, wherein a thickness of said one or more zones can be specified by providing a constant value representing an absolute number or a percentage of the total thickness of said zones.

43. The computer-readable medium of claim 38, wherein the vertical layering step further comprises:
performing the step of generating fine scale resolution.

44. The computer-readable medium of claim 43, wherein the skeleton grid includes existing horizon nodes, and wherein the step of generating fine scale resolution comprises adding new horizon nodes between said existing horizon nodes in said skeleton grid.

45. The computer-readable medium of claim 44, wherein the step of generating fine scale resolution further comprises:
adding layers from a base or a top of said zone using constant thickness.

46. The computer-readable medium of claim 44, wherein the step of generating fine scale resolution further comprises:
adding layers by proportional thickness using a specified number of layers.

47. The computer-readable medium of claim 44, wherein the step of generating fine scale resolution further comprises:
adding layers from a base or a top of said zone using a dipping surface.

48. The computer-readable medium of claim 26, wherein the method of modeling geological structures further comprises:
projecting a middle node point of each pillar of the group of pillars onto a plane;
placing a plurality of gridlines onto the plane based on a perpendicular condition and a cell size condition; and
generating a skeleton grid using the plurality of grid lines as a layout for the skeleton grid.

49. The computer-readable medium of claim 26, wherein an elevation of the horizon node on the pillar is determined by local interpolation using an input point closest to the pillar.

50. The computer-readable medium of claim 26, wherein the plurality of input points exists in a cylindrical volume centered on the pillar, wherein a dimension of the cylindrical volume is based on the user specified distance.

51. A system adapted for modeling geological structures in an Earth formation, comprising:

first apparatus adapted for modeling one or more fault planes in said Earth formation using a group of pillars in three dimensions, wherein the group of pillars describes the one or more fault planes, wherein a fault plane of the one or more fault planes has a base level, a middle level, and a top level, a pillar of the group of pillars being a spline curve defined by at least three node points that intersect the fault plane at the base level, the middle level, and the top level of the fault plane, respectively, and wherein a shape of the pillar is adjustable by changing at least one of the at least three node points defining the pillar,
wherein each pillar of the group of pillars has a horizon node describing a horizon near the pillar, and
wherein an elevation of the horizon node on the pillar is determined by interpolation using a plurality of input points within a user specified distance from the pillar.

52. The system of claim 51, wherein the first apparatus comprises:
apparatus adapted for generating a wire frame structure based on said group of pillars.

53. The system of claim 52, wherein said group of pillars includes a vertical pillar.

54. The system of claim 52, wherein said group of pillars includes a linear pillar.

55. The system of claim 52, wherein said group of pillars includes a listric pillar.

56. The system of claim 52, wherein said group of pillars includes a curved pillar.

57. The system of claim 52, wherein the system adapted for modeling geological structures further comprises:
apparatus adapted for incorporating said group of pillars describing said one or more fault planes into a three dimensional skeleton grid representing a fault model adapted for said modeling of said geological structures.

58. The system of claim 57, wherein said skeleton grid is limited by a boundary.

59. The system of claim 58, wherein boundary comprises a two dimensional curve between said faults.

60. The system of claim 57, wherein the system adapted for modeling geological structures further comprises:
apparatus adapted for performing a vertical layering, said vertical layering including adding geological horizons into said skeleton grid thereby forming a complete geological description.

61. The system of claim 60, wherein the apparatus adapted for performing said vertical layering comprises: apparatus adapted for modeling primary horizons.

62. The system of claim 61, wherein primary horizons are added to said geological description when said apparatus is modeling said primary horizons.

63. The system of claim 61, wherein the apparatus adapted for performing said vertical layering further comprises:
apparatus adapted for performing geological zonation.

64. The system of claim 63, wherein a volume between the primary horizons is divided into one or more zones separated by new secondary horizons when said apparatus is performing said geological zonation.

65. The system of claim 64, wherein a thickness of said one or more zones can be specified by providing an isochore, said isochore representing a surface further representing a vertical thickness of said zones.

66. The system of claim 64, wherein a thickness of said one or more zones can be specified by providing isopacks, said isopacks representing a surface further representing a stratigraphic thickness of the zones.

67. The system of claim 64, wherein a thickness of said one or more zones can be specified by providing a constant value representing an absolute number or a percentage of the total thickness of said zones.

68. The system of claim 63, wherein the apparatus adapted for performing said vertical layering further comprises:
apparatus adapted for generating fine scale resolution.

69. The system of claim 68, wherein the skeleton grid includes existing horizon nodes, and wherein the apparatus adapted for generating fine scale resolution comprises apparatus adapted for adding new horizon nodes between said existing horizon nodes in said skeleton grid.

70. The system of claim 69, wherein the apparatus adapted for generating fine scale resolution further comprises:
apparatus adapted for adding layers from a base or a top of said zone using constant thickness.

71. The system of claim 69, wherein the apparatus adapted for generating fine scale resolution further comprises:
apparatus adapted for adding layers by proportional thickness using a specified number of layers.

72. The system of claim 69, wherein the apparatus adapted for generating fine scale resolution further comprises:
apparatus adapted for adding layers from a base or a top of said zone using a dipping surface.

73. The system of claim 51, wherein the system adapted for modeling geological structures further comprises:
apparatus adapted for projecting a middle node point of each pillar of the group of pillars onto a plane;
apparatus for placing a plurality of gridlines onto the plane based on a perpendicular condition and a cell size condition; and
apparatus for generating a skeleton grid using the plurality of grid lines as a layout for the skeleton grid.

74. The system of claim 51, wherein an elevation of the horizon node on the pillar is determined by local interpolation using an input point closest to the pillar.

75. The system of claim 51, wherein the plurality of input points exists in a cylindrical volume centered on the pillar, wherein a dimension of the cylindrical volume is based on the user specified distance.

* * * * *